United States Patent [19]
Munsey

[11] Patent Number: 6,116,761
[45] Date of Patent: Sep. 12, 2000

[54] ILLUMINATING PICKUP TRUCK BED COVER

[76] Inventor: Ronald L. Munsey, 3218 Hunterwood, Missouri City, Tex. 77459

[21] Appl. No.: 09/310,754

[22] Filed: May 13, 1999

Related U.S. Application Data

[60] Provisional application No. 60/085,939, May 19, 1998.
[51] Int. Cl.[7] .................................................. B60Q 1/00
[52] U.S. Cl. ..................... 362/485; 362/45; 362/543; 362/496; 362/296
[58] Field of Search ............................ 362/45, 543, 496, 362/296, 311, 307, 310

[56] References Cited

U.S. PATENT DOCUMENTS

| | | |
|---|---|---|
| 1,196,760 | 9/1916 | Clark . |
| 1,418,596 | 6/1922 | Mensoian . |
| 1,452,029 | 4/1923 | Deuel . |
| 1,921,290 | 8/1933 | Gragg et al. . |
| 4,033,619 | 7/1977 | Cox . |
| 4,303,969 | 12/1981 | Hamilton et al. . |
| 4,340,929 | 7/1982 | Konikoff et al. . |
| 4,557,517 | 12/1985 | Bolduc et al. . |
| 4,745,525 | 5/1988 | Sheehy . |
| 4,816,968 | 3/1989 | Yamada et al. . |
| 4,941,074 | 7/1990 | DeCosse et al. . |
| 5,005,893 | 4/1991 | McCrary . |
| 5,083,826 | 1/1992 | McCrary . |
| 5,122,933 | 6/1992 | Johnson . |
| 5,238,281 | 8/1993 | Chen . |
| 5,400,225 | 3/1995 | Currie . |
| 5,495,400 | 2/1996 | Currie . |
| 5,795,051 | 8/1998 | Galanski . |
| 5,827,023 | 10/1998 | Stull . |
| 6,000,821 | 12/1999 | Beliakoff .................................. 362/485 |

*Primary Examiner*—Sandra O'Shea
*Assistant Examiner*—Anabel M. Ton
*Attorney, Agent, or Firm*—Thomason Moser & Patterson L.L.P.

[57] ABSTRACT

A pickup truck bed cover that includes a top member and a bottom member wherein either the top member or the bottom member or both are partially or wholly translucent, and wherein the top member is disposed upon the bottom member forming a space between the top member and the bottom member. The pickup truck bed cover also includes a light source disposed within the space between the top member and the bottom member, whereby the light source emits light to illuminate the translucent portion of the top member or bottom member.

1 Claim, 2 Drawing Sheets

ILLUMINATING PICKUP TRUCK BED COVER

RELATED APPLICATIONS

This application claims the benefit of U.S. Provisional Application No. 60/085,939, filed May 19, 1998.

BACKGROUND OF THE INVENTION

This invention relates to pickup truck bed covers which protect the bed of a pickup truck, and its contents, from external forces or weather conditions, including rain, snow, hail, and wind. Preferably, the invention relates to a pickup truck bed cover that illuminates color in the dark.

SUMMARY OF INVENTION

This invention is broadly directed to a pickup truck bed cover ("lid"). In a specific embodiment, the cover includes a flat hollow member with at least an upper and a lower flat portion defining a space within the member wherein at least a portion of either the upper or lower flat portions (preferably just the upper portion) includes a translucent material; and a light source disposed within the space, such that the light source is capable of emitting light through the translucent material.

This invention is also directed to a pickup truck bed cover, which includes a top member; and a bottom member. Either the top member or the bottom member (or both) is partially or wholly translucent. The top member is disposed upon the bottom member to form a space between the top member and the bottom member. A light source is disposed within the space between the top member and the bottom member, whereby the light source emits light through the translucent portions of either the top member or the bottom member (or both).

Figure 1:
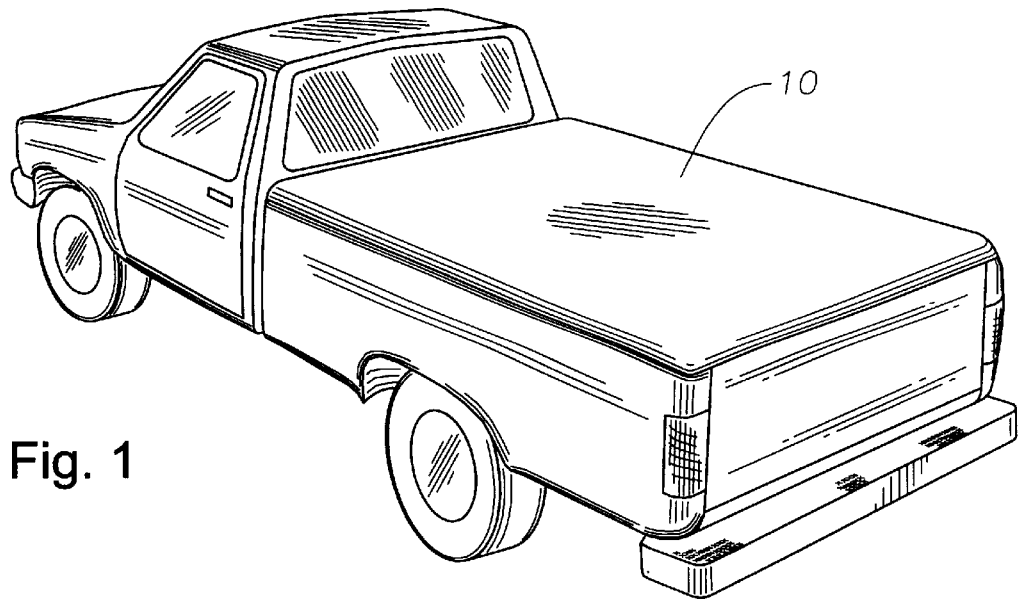
FIG. 1 shows a side perspective view of a pickup truck with the truck bed cover in a closed position.

While the invention will be described in connection with the preferred embodiment, it will be understood that it is not intended to limit the invention to those embodiments. On the contrary, it is intended to cover all alternatives, modifications, and equivalents as may be included within the spirit and scope of the invention as defined by the appended claims.

DETAILED DESCRIPTION OF THE INVENTION

Referring to the drawings in detail, wherein like numerals denote identical elements throughout several views, it can been seen, with reference to FIGS. 1–6, and in a specific embodiment, the pickup truck bed cover includes: a top member, a lighting space, a bottom member and a light source within the lighting space. In one embodiment, either the top member or the bottom member, or both, are preferably partially or wholly translucent, i.e., permitting at least a portion of the light from the light source to pass or shine through the translucent portion, providing an illuminating or "glowing" effect. In a specific embodiment, the translucent portion of the top member is made of colored plastic (e.g., green). The translucent portion may also form a pattern, e.g., stripes, stars, or names, so that the illuminated portion is in a desired shape.

In a specific embodiment, the pickup truck bed cover, also referred to as a "lid," not only serves to cover the bed of the pickup truck, thus protecting the contents from theft or the weather, but is also aesthetically pleasing, by virtue of the glow given off by the light source. The truck bed cover described herein can also be combined with conventional truck bed covers (which have no translucent features) by placing it on top of the conventional truck bed cover.

Figure 3:
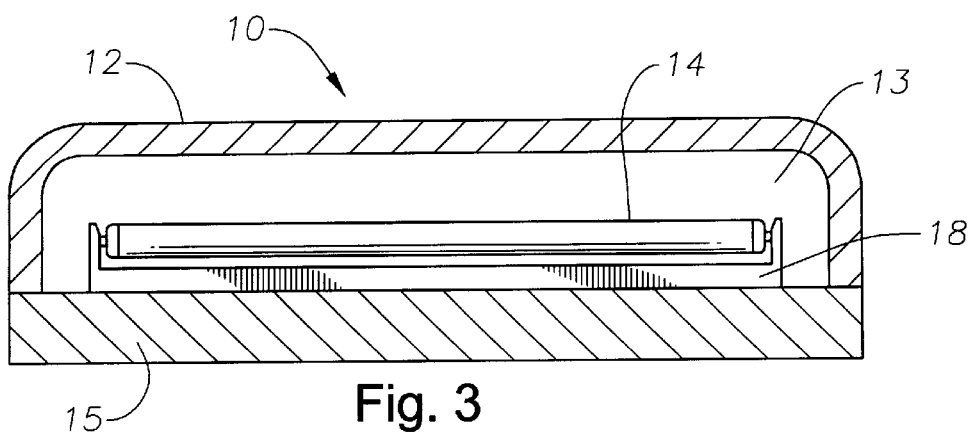
FIG. 3 shows a cross-sectional frontal view of one embodiment of a truck bed cover.

Referring to a specific embodiment shown in FIG. 3, the truck bed cover 10 is typically placed on top of a truck bed, around the top of the side walls. The top member 12 forms the top layer or sheet element of the truck bed cover 10. This top member 12 is preferably an extruded sheet of plastic, as shown in FIG. 3. In a specific embodiment, the top member 12 has a thickness from about 0.375 to 0.50 inches. A portion of the light from the light source passes or shines through the plastic material. In another specific embodiment, this top member 12 is of a certain color, e.g., green or purple.

Preferably, the light source, once the power is turned on or activated, will shine light up through the translucent colored plastic upper member, illuminating the entire surface of the upper member. Preferably, to avoid violating Department of Transportation regulations, the illuminated surface is not visible from one side of the truck (e.g., the rear), or optionally is not visible from all sides of the truck. Thus, the sides of the lid are preferably not translucent, or are covered by opaque material. Alternatively, the top member can have a lip around all or part of its upper surface so that the illuminated surface is not visible from other vehicles.

To assemble the bed cover 10, the top member 12 is attached to a bottom member 15, thus forming an enclosed housing with a lighting space 13 located between the top member 12 and the bottom member 15. The top member 12 can be attached to the bottom member 15 in any conventional manner, preferably with fasteners (e.g. bolts, pins, snaps or buttons) or epoxy/adhesive. In one embodiment the bottom member 15 is made of a metal sheet. In another embodiment, the bottom member 15 is metal but is also coated with a fiberglass or vinyl material.

Figure 4:
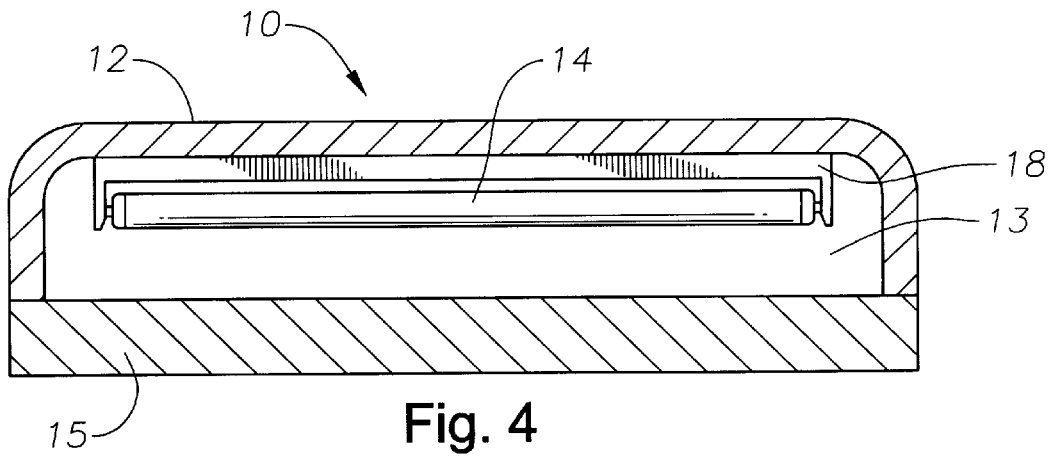
FIG. 4 shows a cross-sectional frontal view of another embodiment of a truck bed cover.
Figure 5:
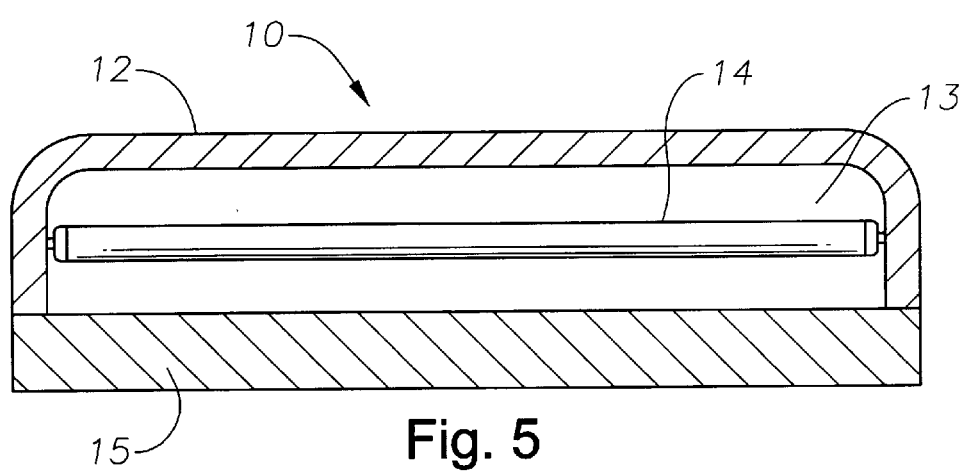
FIG. 5 shows a cross-sectional frontal view of one other embodiment of a truck bed cover.
Figure 6:
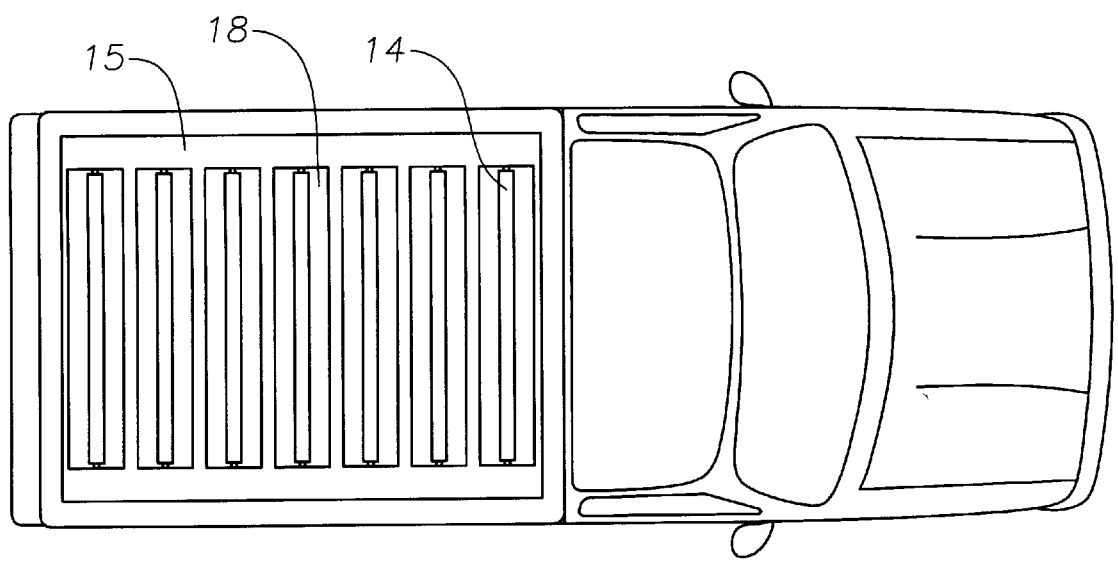
FIG. 6 shows a top view of FIG. 3 cover without the top member.

A light source is placed within the lighting space 13 to emit light through the truck bed cover 10 into the surrounding air. As one type of light source, for example, conventional fluorescent light tubes 14 can be placed within the lighting space 13. These fluorescent light tubes 14 enable the truck bed cover 10 to be luminescent, especially in the dark. Each light tube 14 can be inserted into a lighting support 18, which houses the conduit (not shown) supplying electrical current to the light tube 14. Electrical current can be supplied to the light tubes 14 using conventional means, e.g., from the truck battery or a separate battery (not shown) connected to the light tubes 14. The lighting supports 18 can be fastened to the bottom member 15, preferably with fasteners or epoxy/adhesive. The truck bed cover 10 is capable of providing a plurality of lighting supports 18 and light tubes 14 as shown in FIG. 6. In a separate embodiment, the light tubes 14 can be placed within the lighting supports 18, which are fastened to the top member 12 as shown in FIG. 4. Another embodiment is shown in FIG. 5 where the lighting tubes 14 are directly connected to the top member 12. Here, the top member 12 includes the conduit supplying the electrical current to the light tubes 12. In any case, a variety of light source forms can be disposed within the lighting space 13.

Figure 2:
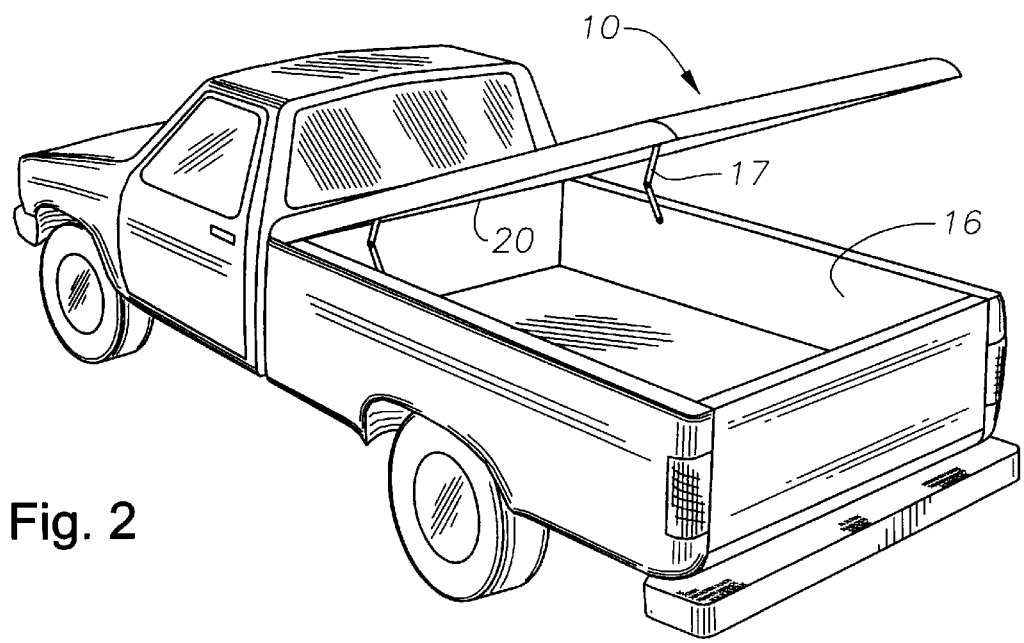
FIG. 2 shows a rear perspective view of the truck having a bed cover in an open position.

As shown in FIG. 2, the entire truck bed cover 10 is connected to the side walls 16 of the truck bed, preferably by any commercially available hinge 17, enabling the truck bed cover 10 to be easily opened and closed. These hinges 17 can be either hydraulic, electrical, or mechanical arms. Furthermore, the front edge of the truck cover bed 10 is attached to the front end 20 of the truck bed by a conventional method, such as a hinge. In a specific embodiment, the exterior thickness of the truck bed cover 10 measured from the outer edge of the top member to the outer edge of the bottom member should be about 2.5 inches to 3.0 inches.

Still another specific embodiment of the invention is directed to a truck bed cover that includes: (a) a flat member that is wholly or partially translucent, preferably a flat member made entirely of a translucent material; and (b) a light source for illuminating light upward through the translucent material, preferably, one or more light bulbs. In this embodiment, the truck bed cover has no bottom member, and the light source is not enclosed within an enclosed space. Further, as indicated above, it is preferred that the translucent material have a non-white, non-black color, e.g., green, red, or yellow.

It is noted that this invention is to be defined by the claims, including the elements recited in those claims and their substantial equivalents. Accordingly, the invention is by no means limited to the truck bed covers described in connection with the specific embodiments of this invention, and particularly is not limited to the structure shown in the drawings.

What is claimed is:

1. A pickup tuck bed cover, which comprises:
   (a) a cover assembly including at least one top member and at least one bottom member;
   (b) the top and bottom members being flat and rectangular;
   (c) the top member being partially or wholly translucent, at least partially attached to the bottom member and disposed in substantially coplanar relation to the bottom member to provide a space between the top member and the bottom member;
   (d) a light source disposed within the space between the top member and the bottom member, wherein the light source is capable of emitting light to illuminate the translucent portion of the top member; and
   (e) means for attaching said cover assembly to a pickup truck bed.

* * * * *